United States Patent [19]

Kober

[11] 4,009,605
[45] Mar. 1, 1977

[54] METHOD FOR DETERMINING $T_{250}$ TEMPERATURE

[75] Inventor: Alfred E. Kober, Hopatcong, N.J.

[73] Assignee: Apollo Chemical Corporation, Whippany, N.J.

[22] Filed: Feb. 24, 1976

[21] Appl. No.: 660,828

[52] U.S. Cl. .............................. 73/56; 23/230 PC; 23/253 PC; 23/292

[51] Int. Cl.$^2$ .............................. G01N 11/04

[58] Field of Search ... 23/230 PC, 253 PC, 292 US; 73/54, 56; 201/1

[56] References Cited

UNITED STATES PATENTS

| | | | |
|---|---|---|---|
| 3,187,563 | 6/1965 | Tobias | 73/56 |
| 3,521,482 | 7/1970 | Griffith et al. | 73/56 |
| 3,625,050 | 12/1971 | Noetzel et al. | 73/56 |

OTHER PUBLICATIONS

ASTM Standards, Tentative Method of Test for Fusibility of Coal Ash, D1857–64T, pp. 340, 343 (Feb. 1965).

Primary Examiner—Joseph Scovronek

[57] ABSTRACT

The temperature at which a given coal ash has viscosity of 250 poises is determined using test apparatus comprising a container having at the base thereof a generally circular aperture of substantially 0.25 inch diameter and a support for the container including a compartment positioned below the container and communicating with the interior of the container through the aperture. A thick paste sample formed by mixing the given coal ash with a thickener solution is packed into the container and the sample heated at a predetermined slow rate until the coal ash therein becomes molten and fills a vertical section of the compartment, the temperature of the sample at that point being approximately the temperature at which the coal ash has a viscosity of 250 poises.

11 Claims, 6 Drawing Figures

4,009,605

METHOD FOR DETERMINING $T_{250}$ TEMPERATURE

BACKGROUND OF THE INVENTION

The present invention relates to a method for rapidly determining the temperature at which a given coal ash has a viscosity of 250 poises.

In order to determine whether a particular coal can be used successfully in slag tap or other wet bottom furnaces, it is necessary to evaluate the flow properties of the molten ash from that coal. It is generally recognized that in order for the molten ash to tap successfully, it must have a viscosity equal to or less than 250 poises at the temperature at which it is to flow. Thus the temperature at which the molten ash has a viscosity of 250 poises is commonly referred to as the $T_{250}$ temperature, this being the minimum temperature which the molten ash must possess in order to tap successfully.

Ideally, this minimum temperature is obtained from a plot of the viscosity of the molten ash versus temperature. Less satisfactorily, the temperature can be estimated from a chemical analysis of the coal ash, as shown, for example, in *Steam* (published by Babcock and Wilcox in 1972), pages 15-3 to 15-5 in particular. This procedure, however, requires a lengthy laboratory procedure to determine the exact chemical composition of the ash. In practice, actual viscosity measurements on molten ash are difficult to obtain and require the use of expensive, sophisticated equipment such as a high-temperature rotating-bob viscometer or the like.

Thus in those instances where a plot of the viscosity of the molten ash to be tested versus temperature are not available, there remains the need for a simple and economical method for rapidly determining the $T_{250}$ temperature for a given coal ash without the need for either time-consuming analytical procedures or painstaking actual viscosity measurements made on expensive equipment.

Accordingly, it is an object of the present invention to provide a method for rapidly determining the temperature at which a given coal ash has a viscosity of about 250 poises.

It is also an object to provide such a method which does not require time-consuming analytical procedures or painstaking viscosity measurements on expensive equipment.

It is a further object to provide such a method which permits such a determination to be made rapidly and economically.

Another object is to provide such a method in which the results obtained closely approximate the results obtained through a chemical analysis of the ash.

SUMMARY OF THE INVENTION

The above and related objects are obtained in a method for rapidly determining the temperature at which a given coal ash has viscosity of 250 poises using simple and economical test apparatus. The test apparatus comprises an open top container having at the base thereof a generally circular aperture of substantially 0.25 inch diameter, and a support for the container including a compartment at least partially positioned below the container and communicating with the interior of the container through the aperture. At least a vertical section of the compartment directly beneath the aperture must be available to visual inspection. Preferably the compartment extends horizontally beyond the aperture for a substantial length.

A predetermined quantity of a thick paste sample formed by mixing a given coal ash with a thickener solution is first packed into the container. The predetermined quantity of the sample is selected to include sufficient coal ash to fill the vertical section of the compartment available for visual inspection. Then the sample is heated in a high temperature furnace at a predetermined slow rate at least until the coal ash therein becomes molten and fills at least the vertical section of the compartment. The temperature of the sample at the point at which the molten coal ash just fills the vertical section of the compartment is approximately the temperature at which the coal ash has a viscosity of 250 poises.

In a preferred embodiment, a segment of the container base defining the aperture is substantially vertically aligned with a contiguous segment of the inner surface of the compartment to form a continuous surface. The sample is packed into the container in such a manner that a portion of the sample connects through the aperture both vertically aligned contiguous segments, thus providing a "starter" which wets the surface along which the molten ash will flow.

The sample is preferably heated at a predetermined rate of about 10°–20F° per minute, the temperature of the sample being monitored during the heating step so that the temperature corresponding to the end point is easily and rapidly determinable.

The thickener solution used in forming the thick paste sample typically comprises an organic material having a combustion point substantially below the temperature at which the coal ash becomes molten, and may be, for example, starch or dextrin. In order to prevent splattering of the sample during the heating step, the sample may be preheated after packing into the container to thoroughly dry the sample.

DETAILED DESCRIPTION OF THE PREFERRED EMBODIMENTS

The coal ash to be tested can be prepared from coal by any of the conventional techniques used for that purpose, including the standard ASTM procedure D271-68. Alternatively, the rapid ashing technique described below may be utilized to provide a useful quantity of ash in a relatively brief period of time relative to that required for the ASTM procedure.

Figure 6:
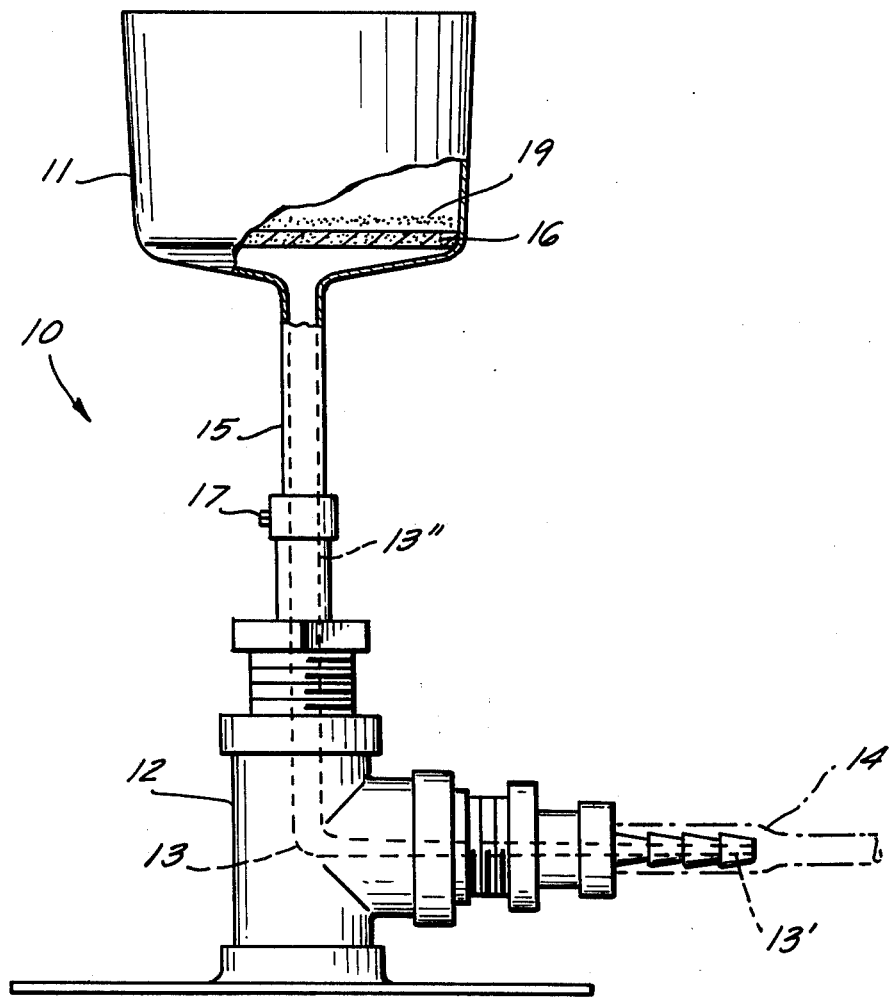
FIG. 6 is a side elevation view, partially in cross-section, of apparatus useful in the rapid ashing of coal according to the present invention.

Referring now to the drawings and in particular to FIG. 6 thereof, therein illustrated is the rapid ashing apparatus generally designated by the numeral 10 and comprising a stainless steel Buchner funnel 11 removably mounted atop a suitable base 12. The base 12 defines a gaseous conduit 13, one end 13' thereof being adapted for a connection to the outlet 14 (illustrated in phantom) of a gas supply (not shown) and the other end 13'' thereof communicating with the interior of the hollow stem 15 of the funnel 11. The funnel 11 includes a coarse grade sintered steel plate 16 at the bottom thereof, and the entire funnel 11 is preferably secured to the base 12 by means of a screw connection 17 to facilitate subsequent removal of the funnel 11 from the base 12 to permit easy removal of ash from the funnel 11.

In the rapid ashing technique, about 10 grams of a coal sample 19, crushed or pulverized to 8–200 mesh, is spread evenly over the bottom of the funnel 11, that is, on top of the steel plate 16. The coal sample 19 is then ignited by directing a flame (for example, from a laboratory burner) down onto the surface thereof. If desired, a small quantity of kerosene or other inflammable fluid may be sprinkled upon the coal 19 prior to ignition to facilitate the ignition of difficult coals. Once the coal 19 commences to burn (that is, after the glowing combustion is self-sustaining for a few seconds after removal of the burner), air from the air supply is permitted to flow through the gaseous conduit 13 of the base 12, up the funnel stem 15, and through the steel plate onto the coal sample 19. The air flow commences at the rate of about 0.8–1.2 liter per minute and is gradually raised to a maximum of about 2.5–3.5 liters per minute. Depending on the fineness of the grinding of the coal sample 19, the air flow maximum rate may have to be adjusted slightly downwardly to avoid loss of the sample 19. The coal 19 is allowed to burn or smolder under the maximum air flow rate for about ten minutes, after which the air flow is stopped. The terminated air flow is then replaced by an oxygen flow at an initial rate of 0.8–1.2 liter per minute for about 10 minutes. After the ten minute oxygen flow has elapsed, the oxygen flow is increased carefully up to a maximum of about 2.8–3.2 liters per minute as necessary to maintain glowing combustion. When the glowing combustion ceases, usually in less than 10 minutes, the coal 19 is suitably ashed for use in fusibility tests or in the rapid $T_{250}$ temperature determination described below. For more critical analysis, any residual unburned material in the funnel 11 can be removed by transferring the ash to a crucible and heating it in a muffle furnace at 750°–800° C for 10–15 minutes.

A typical 10 gram sample of crushed or pulverized coal can be ashed completely in 40 minutes to provide 1–2 grams of ash. To obtain large ash quantities from low ash coals, the apparatus can be modified either by using a larger funnel and sample or by using several funnels attached to a single stem or manifold. The ash content (the weight of the ash produced as a percentage of the weight of the coal sample) as determined by the rapid ashing technique of the present invention is in remarkably good agreement with the ash content as determined by the ASTM method, although the rapid ashing technique requires only 40 minutes and the ASTM method requires several hours. Generally the ash content data produced by the rapid ashing technique is less than 3% below the ash content data obtained by the ASTM method.

Figure 2:
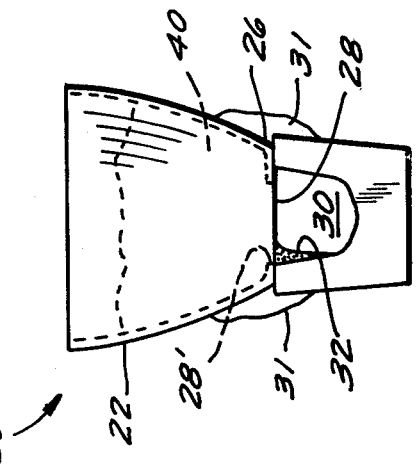
FIG. 2 is a side elevation view of the test apparatus of FIG. 1.
Figure 1:
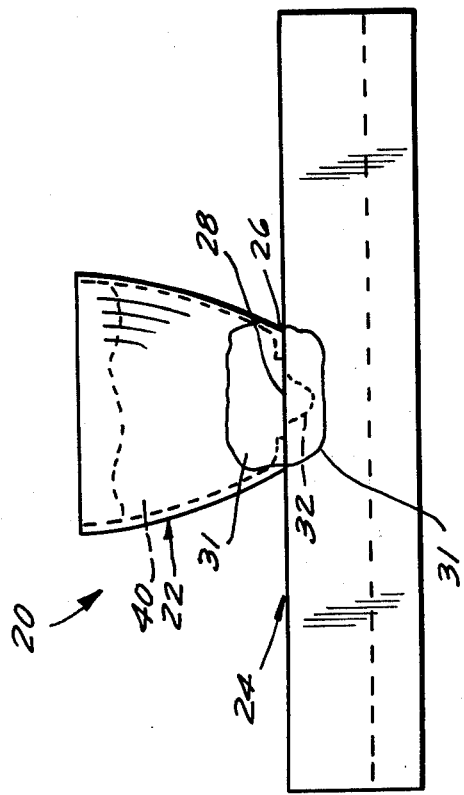
FIG. 1 is a side elevation view of the test apparatus used in the present invention.

Referring now to FIGS. 1 and 2, therein illustrated is apparatus generally designated by the numeral 20 and useful in rapidly determining the temperature at which a given coal ash has a viscosity of 250 poises. The apparatus 20 comprises an open top container or crucible generally designated by the numeral 22 and a support generally designated by the numeral 24 and adapted to maintain the crucible 22 thereabove. The crucible 22 includes a base 26 defining a generally circular aperture 28 having a diameter of substantially 0.25 inch. Generally a crucible with a 2 milliliter capacity is convenient and adequate for receipt of a 1 gram ash sample. The support 24 includes a compartment 30 at least partially positioned below the crucible 22 and communicating with the interior of the crucible 22 through the aperture 28. At least a vertical section of the compartment 30 directly beneath aperture 28 must be subject to visual inspection. Preferably the compartment 30 also extends horizontally beyond the circumference of aperture 28 for a substantial length.

The test apparatus 20 may conveniently be formed by drilling a 0.25 inch diameter hole in the bottom of a small crucible (size 4/0, having a 2 milliliter capacity), removing at least one end from a refractory combustion boat (such as a Lecotherm combustion boat having dimensions of 3¾ × ½ × 7-1/6 inches), and then mounting the crucible on the base with a refractory cement 31. As illustrated in FIG. 2, at least one edge surface 28' of the crucible base 26 defining the aperture 28 is preferably substantially vertically aligned with a contiguous segment 30' (see FIG. 5) of the inner surface of the compartment 30 to form a continuous surface for the flowing melt.

A thick paste sample 40 is formed by mixing a thickener solution with a predetermined quantity of coal ash sufficient to fill a vertical section of the compartment 30. The thickener solution is preferably an aqueous solution of an organic material, such as starch or dextrin, having a combustion point substantially below the temperature at which the coal ash to be tested becomes molten. While the quantity of coal ash to be included in the sample 40 will be dependent upon the size of the compartment 30, generally a 1 gram quantity has been found to be sufficient.

The initial step in packing the paste sample 40 into the crucible 22 is spreading a small amount of the paste sample 40 along a segment 28' of the crucible base 26 defining the aperture 28 and at least part way down a contiguous segment 30' of the support inner surface. In this manner, a portion of the paste sample 40 connects through aperture 28 the vertically aligned contiguous segments 28', 30' and serves as a "starter" 32 to facilitate the flow of molten ash by providing a pre-wet surface.

It will be noted that if the edges 28' and 30' are not carefully aligned to provide a continuous surface for the flowing melt or if a "starter" 32 is not provided to facilitate flow, erratic results may be obtained due to the high surface tension of the molten ash. Furthermore, to prevent sputtering of the paste sample 40 during heating thereof, it is preferred that the packed sample 40 be pre-heated at oven temperatures or otherwise thoroughly dried.

Finally the test apparatus 20 including the thoroughly dried sample 40 is placed in a muffle or other high temperature furnace having an observation port permitting the vertical section of the compartment 30 to be observed visually. The sample 40 is then heated at a pre-determined slow rate at least until the coal ash therein becomes molten and fills at least the vertical section of the compartment 30. Preferably the sample 40 is heated in the furnace at a rate of approximately 10°–20F° per minute. Prior to the time that the coal ash becomes molten, the organic portion of the thickener solution in sample 40 will undergo combustion, with the products thereof vaporizing. Eventually the remaining molten ash of sample 40 will be observed to flow along the starter 32, down the side of the compartment 30, eventually filling the open space of the compartment 30 immediately below the crucible 22. The $T_{250}$ temperature is assumed to be the temperature at which the molten ash of sample 40 just fills the vertical section of compartment 30 under the crucible 22. Preferably the test apparatus 20 includes means for monitoring the temperature of the sample 40 during the heating thereof in the high temperature furnace.

Figure 5:
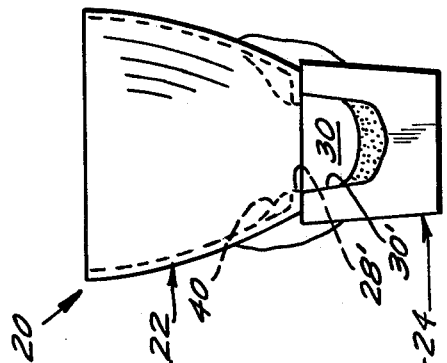
FIGS. 3–5 are side elevation views of the test apparatus showing the sample before, when, and after it has reached the $T_{250}$ temperature, respectively.
Figure 4:
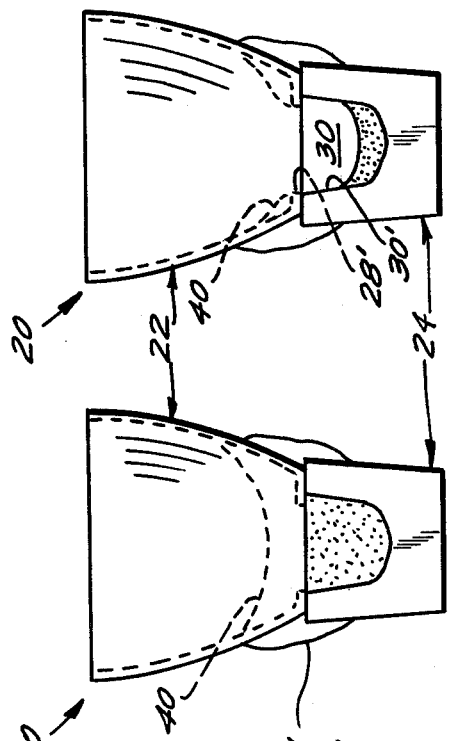
Figure 3:
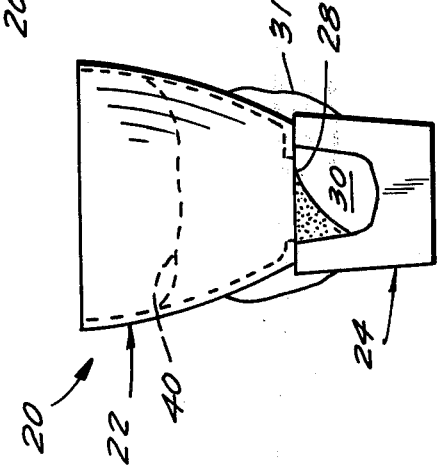

Referring now to FIGS. 3–5, FIG. 3 illustrates the sample at a flow point well below the $T_{250}$ temperature, the high surface tension of the partially molten ash causing it to bunch along the starter 32. FIG. 4 illustrates the sample at the $T_{250}$ temperature, the whole vertical section of the compartment 30 being occupied by molten ash. FIG. 5 illustrates the sample at a temperature well above the $T_{250}$ temperature, the viscosity of the molten ash being so low that the molten ash in the vertical section of compartment 30 has begun to flow horizontally within the compartment 30 to either side of the aperture 28 (that is, away from directly underneath the crucible 22). As a result, the vertical section of the compartment 30 is no longer completely filled with molten ash.

The efficacy of the present invention is illustrated in the examples below, wherein all parts are by weight unless otherwise noted.

EXAMPLE I

The $T_{250}$ temperatures of a variety of representative coal ash compositions were estimated using the well known base/acid ratio method based on a chemical analysis of the ash. $T_{250}$ temperatures were also determined using the rapid determination method of the present invention. For each ash the chemical analyses and the calculated and the rapidly determined $T_{250}$ temperatures are set forth in Table I. Each rapidly determined $T_{250}$ temperature in Table I represents an average of several determinations, and in each case, the range of the individual values is given.

As illustrated by the data of Table I, repeatability or reproducibility of the determined $T_{250}$ temperature is generally within plus or minus 100F°, and the rapidly determined temperature lies well within 100F° of the measured temperature for each ash.

EXAMPLE II

To determine the effect of variations in orifice size on the measured $T_{250}$ temperature, three of the ashes from Table I were used in the rapid determination process of the present invention, but with the orifices varying from 1/16 to 5/16 inch. The flow point and calculated $T_{250}$ temperatures for each ash and each orifice size are reported in Table II.

The data in Table II indicate that, for each ash, the flow point temperature varied inversely with the size of the orifice, and that the flow point temperature for an orifice diameter of 0.25 inch (corresponding to the orifice size required in the testing apparatus of the present invention) corresponded most closely to the calculated $T_{250}$ temperature.

To summarize, the present invention provides a method for rapidly determining the temperature at which a given coal ash has viscosity of 250 poises, the method not requiring any elaborate testing equipment compartment being rapid and inexpensive in nature, yet providing excellent correlation with the $T_{250}$ temperature estimated from a detailed chemical analysis of the ash.

Now that the preferred embodiments of the present invention have been described in detail, various modifications and improvements thereon will become readily apparent to those skilled in the art. Accordingly, the spirit and scope of the present invention is to be limited only by the appended claims.

TABLE I

| | Ash Sample Number | | | | | |
|---|---|---|---|---|---|---|
| | 9390 | 7380 | 7041 | 5570 | 7538 | 5221 |
| % $SiO_2$ | 52.9 | 54.54 | 51.18 | 48.59 | 51.40 | 34.38 |
| % $Al_2O_3$ | 28.7 | 22.68 | 15.89 | 19.11 | 18.17 | 12.57 |
| % $Fe_2O_3$ | 3.4 | 10.15 | 6.10 | 13.98 | 22.73 | 24.24 |
| % CaO | 9.1 | 1.12 | 13.35 | 7.04 | 3.61 | 12.73 |
| % MgO | 1.0 | 1.62 | 3.06 | 1.21 | 1.23 | .84 |
| % $Na_2O$ | 1.4 | .29 | 1.21 | .75 | 1.64 | .41 |
| % $K_2O$ | .3 | 3.62 | .64 | 2.53 | 2.12 | 1.02 |
| % Base[1] | 15.7 | 17.9 | 26.6 | 27.4 | 31.0 | 45.5 |
| Silica ratio[2] | 79.7 | 80.9 | 69.4 | 68.6 | 65.1 | 47.6 |
| Base/acid ratio[3] | .19 | .22 | .36 | .38 | .45 | .84 |
| Calc'd $T_{250}$[4] | 2750° F | 2700° F | 2450° F | 2430° F | 2350° F | 2175° F |
| Measured $T_{250}$[5] | 2710 | 2685 | 2450 | 2430 | 2385 | 2210 |
| | ±50° F | ±5° F | ±30° F | ±60° F | ±30° F | ±80° F |

[1] % Base = $\dfrac{(Fe_2O_3 + CaO + MgO + Na_2O + K_2O) \, 100}{Fe_2O_3 + CaO + MgO + Na_2O + K_2O + Al_2O_3 + SiO_2}$

[2] Silica ratio = $\dfrac{SiO_2 \times 100}{SiO_2 + Fe_2O_3 + CaO + MgO}$

[3] Base/acid ratio = $\dfrac{Fe_2O_3 + CaO + MgO + Na_2O + K_2O}{SiO_2 + Al_2O_3}$

[4] Estimated from the B/A ratio.
[5] By the process of the present invention.

TABLE II

| Orifice Diameter | Sample No. 5221 | Sample No. 5570 | Sample No. 7538 |
|---|---|---|---|
| 1/16 in. | 2450° F | 2650° F | >2700° F |
| 3/16 in. | 2360 | 2500 | 2480 |
| ¼ in. | 2210 | 2430 | 2385 |
| 5/16 in. | 2080 | 2320 | 2240 |
| Calc'd $T_{250}$[1] | 2175 | 2430 | 2350 |

[1] estimated from the base/acid ratio - see Table I.

I claim:

1. A method for rapidly determining the temperature at which a given coal ash has a viscosity of 250 poises comprising the steps of
   A. providing apparatus comprising
      i. an open top container having at the base thereof a generally circular aperture of substantially 0.25 inch diameter, and
      ii. a support for said container including a compartment at least partially positioned below said container and communicating with the interior of said container through said aperture, at least a vertical section of said compartment directly beneath said aperture being subject to visual inspection;
   B. packing into said container a thick paste sample formed by mixing a thickener solution with a predetermined quantity of coal ash sufficient to fill said vertical section of said compartment; and
   C. heating said sample at a predetermined slow rate at least until said coal ash therein becomes molten and fills at least said vertical section of said compartment, the temperature of said sample at that point being approximately the temperature at which said coal ash has a viscosity of 250 poises.

2. The method of claim 1 wherein at least a segment of said container base defining said aperture is substantially vertically aligned with a contiguous segment of the inner surface of said compartment to form a continuous surface.

3. The method of claim 2 wherein said sample is packed in step (B) so that a portion thereof connects through said aperture said vertically aligned contiguous segments.

4. The method of claim 1 wherein said sample is packed in step (B) so that a portion thereof connects through said aperture an inner surface of said container base defining said aperture and an inner surface of said compartment.

5. The method of claim 1 wherein said sample is heated in step (C) at a predetermined rate of about 10°–20F° per minute.

6. The method of claim 1 wherein said thickener solution comprises an organic material having a combustion point substantially below the temperature at which said coal ash becomes molten.

7. The method of claim 1 including the step of monitoring the temperature of said sample during the heating thereof in step (C).

8. The method of claim 1 including the step of pre-heating said sample after step (B) and prior to step (C) to thoroughly dry said sample.

9. The method of claim 3 wherein said thickener solution comprises an organic material having a combustion point substantially below the temperature at which said coal ash becomes molten, said sample is heated in step (C) at a predetermined rate of about 10°–20F° per minute, and additionally including the step of pre-heating said sample after step (B) and prior to step (C) to thoroughly dry said sample.

10. The method of claim 1 wherein said compartment extends horizontally beyond the circumference of said aperture for a substantial length.

11. The method of claim 1 wherein said coal ash is obtained from coal by a rapid ashing technique comprising the steps of:
   igniting a crushed or pulverized coal sample until a self-sustaining glowing combustion thereof commences;
   subjecting said sample to an air flow at an initial air flow rate of about 0.8–1.2 liters/minute and gradually increasing the air flow rate to a maximum of about 2.5–3.5 liters/minute;
   maintaining said air flow rate at said maximum air flow rate for about ten minutes prior to terminating said air flow;
   subjecting said sample to an oxygen flow at an initial oxygen flow rate of about 0.8–1.2 liters/minute for about 10 minutes and then gradually increasing the oxygen flow rate to a maximum of about 2.8–3.2 liters/minute as necessary to maintain glowing combustion; and
   maintaining said oxygen flow rate at said maximum oxygen flow rate until the glowing combustion ceases prior to terminating said oxygen flow.

* * * * *

Disclaimer and Dedication 4,009,605.—*Alfred E. Kober*, Hopatcong, N.J. METHOD FOR DETERMINING T250 TEMPERATURE. Patent dated Mar. 1, 1977. Disclaimer and Dedication filed Mar. 10, 1983, by the assignee, *Economics Laboratory, Inc.*

Hereby disclaims and dedicates to the Public the entire remaining term of said patent.

[*Official Gazette September 27, 1983.*]